(12) United States Patent
Pirkle

(10) Patent No.: US 6,325,092 B1
(45) Date of Patent: Dec. 4, 2001

(54) THERMALLY RESPONSIVE VALVE

(76) Inventor: Fred L. Pirkle, 355 Ivyland Rd., Warminster, PA (US) 18974-2205

( * ) Notice: Subject to any disclaimer, the term of this patent is extended or adjusted under 35 U.S.C. 154(b) by 0 days.

(21) Appl. No.: 09/489,432

(22) Filed: Jan. 21, 2000

Related U.S. Application Data

(62) Division of application No. 08/852,334, filed on May 7, 1997, now Pat. No. 6,029,686.

(51) Int. Cl.[7] .......................... F16K 31/524; F16L 37/23; F16L 37/28
(52) U.S. Cl. .................................. 137/315.39; 251/149.5; 251/149.6; 251/252; 251/263; 251/297
(58) Field of Search .................... 251/149.2, 149.5, 251/149.6, 251, 252, 263; 285/304, 308, 315, 316, 317; 137/315.39, 315.01, 315.36

(56) References Cited

U.S. PATENT DOCUMENTS

| | | | |
|---|---|---|---|
| 3,715,099 | * 2/1973 | Shendure | 251/149.6 |
| 4,438,777 | 3/1984 | Pirkle | 137/62 |
| 4,460,007 | 7/1984 | Pirkle | 137/79 |
| 4,815,491 | 3/1989 | Pirkle | 137/62 |
| 4,848,389 | 7/1989 | Pirkle | 137/80 |
| 4,878,512 | 11/1989 | Pirkle | 137/62 |
| 4,883,082 | 11/1989 | Pirkle | 137/62 |
| 5,044,401 | * 9/1991 | Giesler et al. | 137/614.03 |
| 5,056,560 | * 10/1991 | DeMartelaere | 137/614.04 |
| 6,029,686 | 2/2000 | Pirkle | 137/62 |

* cited by examiner

*Primary Examiner*—George L. Walton
(74) *Attorney, Agent, or Firm*—Howson & Hoswon

(57) ABSTRACT

A freeze protection plug has latching balls engageable bayonet-fashion with grooves in a fitting. The balls are normally held in engagement with the grooves by a cam, but move inward to release the plug from the fitting when the cam is moved by a thermal actuator carried by the plug. The balls are retained in tapered openings in the wall of the plug to reduce jamming. Helical ramps in the grooves permit the use of a strong, reliable plug ejecting spring, and make manual insertion of the plug easy. Insertion is aided by the ribs of a plastic cap, which facilitate manual grasping and rotation of the plug. A paint shield ring prevents failures resulting from paint bridges adhering both to the plug and to the fitting. A unitary molded lanyard with two oval loops prevents loss of the plug. The seal on the plug is located on the liquid system side of the latching balls and isolates moving parts from the liquid system, and is of small diameter. The device is calibrated by a screw which applies pressure to the thermally responsive material of the actuator, or by removable discs in engagement with the piston. An auxiliary latch prevents undesired release of the plug after insertion under cold conditions.

8 Claims, 9 Drawing Sheets

THERMALLY RESPONSIVE VALVE

CROSS REFERENCE TO RELATED APPLICATION

This is a division of my application Ser. No. 08/852,334, filed May 7, 1997, now U.S. Pat. No. 6,029,686.

SUMMARY OF THE INVENTION

This invention relates to improvements in thermally responsive valves for normally closing off fluid paths and releasing fluid when a predetermined temperature is attained. A typical thermally responsive valve, used for freeze protection in railroad locomotive coolant systems is described in U.S. Pat. No. 4,815,491, issued Mar. 28, 1989. Its disclosure is incorporated by reference into this specification.

In general, the objective of a freeze protection valve is to cause a water-containing system to be drained automatically when freezing conditions are threatened, so that the expansion which takes place as the water freezes does not damage pipes and other components of the system.

The valve described in U.S. Pat. No. 4,815,491 is an improvement over older freeze protection valves, in that it comprises a plug and fitting which separate from each other when liquid is to be released. All the parts that are likely to require service are contained in the plug, which can be easily and quickly replaced on site without draining the system.

The plug includes a set of radially movable balls that cooperate with a latching surface on the interior wall of the fitting into which the plug is inserted. The balls are situated in cylindrical, radially extending openings in the plug and are normally engaged by a cam within the plug in such a way that they project radially from the plug. However, the cam is axially movable and controlled by a temperature-responsive actuator, also inside the plug. When the temperature falls below a preset limit, the cam moves axially, clearing the balls and allowing them to move radially inwardly off the latching surface. When the balls move off the latching surface, the plug is able to drop out of the fitting. A compression spring is usually provided to assist the release of the plug from the fitting.

In the plug of U.S. Pat. No. 4,815,491, the area surrounding the outer ends of the radial openings is swaged so that the outer ends of the openings are slightly smaller in diameter than the balls. This way the balls are held captive in the openings, but are nevertheless able to protrude for engagement with the latching surface. One of the problems with the prior plug is that, with the swaging process, it was difficult to obtain consistent results. Another problem was that the balls occasionally became jammed in the radial openings in the plug, preventing release of the plug even when the cam cleared the balls.

This invention addresses the problems encountered in the formation and use of the earlier radial openings by utilizing tapered openings. The balls are inserted from inside the plug into the tapered openings, which are formed by passing a drill through larger drill holes diametrically opposite the desired locations of the tapered holes.

Essentially, in this aspect of the invention, the openings are tapered, throughout a major part of their lengths, in the direction from the interior of the plug body toward the exterior of the plug body, the taper being such that the diameter of a first part of each opening is greater than that of the ball situated in the opening, and the diameter of a second part of the each opening, situated outward from the first part thereof, is smaller than the diameter of the ball situated in the opening.

The tapered holes prevent the balls from becoming jammed as they were apt to do in the older cylindrical openings. The taper also provides a sloping surface which exerts an inward force component on the balls as they are cleared by the cam. This also reduces the tendency of the balls to jam.

Another problem with the freeze protection plug described in U.S. Pat. No. 4,815,491 is the difficulty of insertion of the plug into its fitting.

A strong coil spring is provided inside the fitting to ensure ejection of the plug when the critical temperature is reached. The plug is locked in place by a cooperation of the protruding balls with J-shaped grooves formed in the inner wall of the fitting. The balls and grooves together form a bayonet fitting. When the plug is inserted, it compresses the coil spring until the balls reach circumferentially extending parts of the grooves. The plug is then twisted so that the balls move to the ends of the circumferential parts, which have axially extending, ball-receiving notches. The balls are held in these notches by the force of the coil spring.

The coil spring exerts a strong axial force on the plug, opposing insertion and requiring the plug to be pushed as it is twisted. The need to maintain a pushing force on the plug as it is twisted makes insertion difficult. The axial force exerted by the spring also results in a frictional force resisting twisting of the plug. Manual twisting during insertion of the plug is especially difficult because the plug is typically made of polished metal, e.g. stainless steel, and has a circular, cylindrical external portion which extends outwardly when the plug is inserted in the fitting.

This invention addresses the problem of twisting of the plug in two ways. First the grooves formed in the wall of the passageway of the fitting, which cooperate with the balls to form a bayonet joint, are specially shaped to assist engagement of the plug with the fitting. Each groove has a helical ramp surface extending from the circumferential portion thereof obliquely toward the entrance opening of the passageway. The helical ramp surface merges with a surface of the circumferential portion of the groove and is engageable by a ball to urge the plug into the passageway as the plug is twisted. Thus, the cooperation of the balls with the ramp surfaces pushes the plug into place against the ejection spring as the plug is twisted, making it easier to install the plug. Second, a cap tightly fits onto the cylindrical external portion of the plug. The cap has means, for example axial ribs, formed on its exterior surface for facilitating the manual grasping and twisting of the plug for engagement and disengagement with the passageway of the fitting. The ramp and the ribbed cap both facilitate manual engagement of the plug with the fitting, while allowing the coil spring to be strong enough to ensure positive ejection of the plug.

The ribbed cap has several other advantages. If made of a plastics material, it can be provided in a variety of colors which can be used, for example, to provide a ready visual indication of whether or not annual routine maintenance has been performed. The cap can also be formed with an end opening through which a label secured to the end of the plug is exposed. The cap provides a frame for the label, preventing it from being peeled off.

Still another problem encountered with the device of U.S. Pat. No. 4,815,491 is that its thermal actuator is located inside the plug adjacent to the end of the plug which projects outside the fitting. Water in the coolant system being protected by the device, flows into the interior of the plug to come into contact with the body of the actuator. Because of this, there is a risk that debris in the coolant system can come into contact with the balls, the cam or other parts of the latching mechanism, and that the coolant may cause corrosion of the balls or other components. Excessive debris or corrosion may cause failure the plug to release.

This invention addresses the problem of debris and corrosion by positioning the seal of the plug and the cooperating sealing surface of the passageway so that, when engaged with each other, they are located in the passageway between the balls and the liquid-containing system. As a result, the liquid is isolated from the balls and other moving parts.

Because the seal is located on the liquid system side of the ball mechanism, it can be of comparatively small diameter. The small diameter of the seal makes it possible to use an ejection spring that reliably ejects the plug, but is not so strong as to make insertion of the plug difficult. This also reduces the likelihood of damage to the seal.

The expansible material of the thermal actuator is located inside a metal housing forming an end portion of the plug. At least part of this housing is in contact with the liquid in the liquid system. Consequently heat can flow from the expansible material to the liquid system directly through the metal housing.

In earlier, plug-type, freeze protection valves, calibration was carried out by rotating a set screw accessible through an opening at the inner end of the plug to adjust the position of the ball-operating cam relative to the piston of the thermal actuator. However in the improved device in accordance with this invention, the position of the actuator is reversed; its body is at the end of the plug that is in contact with the liquid system and its piston extends, inside the plug, toward the outer end of the plug. To adjust the position of the cam relative to the piston, would require an access opening at the outer end of the plug. The access opening would need to be kept closed to prevent entry of rainwater and road debris into the interior of the plug.

In accordance with this invention, an adjusting screw exerts a compressive force on the thermally expansible material to adjust the position of the piston. Preferably the adjusting screw is provided at the end of the plug that comes into contact with the liquid in the liquid system. By providing for calibration in this manner, it is possible to locate the expansible material in close proximity to the liquid system, and to calibrate the device without the need for access to a calibration screw through the outer end of the plug. It is unnecessary to change the relationship of the piston and the cam.

In an alternative embodiment of the invention, calibration is carried out by inserting or removing small discs between the piston of the actuator and an elastomeric plug in the actuator, thereby changing the position of the piston of the actuator.

Still another problem encountered in the use of plugtype freeze protection valves is that, when the locomotives, or other equipment with which they are used, are painted, the valves are sometimes "painted closed." That is, paint bridging the plug and fitting prevents the plug from being released. To avoid this problem, a flexible shield, connected to and surrounding the plug, is engageable with a surface surrounding the drain opening when the plug is in its inserted condition. The shield prevents paint from sealing the plug to the drain opening, and is sufficiently flexible to allow the ejection spring to remove the plug from the drain opening even when the shield itself is painted. Preferably, the shield is in the form of a molded ring of plastics material having a generally frusto-conical shape and formed with flexible fingers that fit into a groove in the exterior of the plug. The shield covers at least a part of the end face of the fitting surrounding the end opening of the passageway.

Especially in the case of a railroad locomotive freeze protection device, a lanyard is provided to connect the plug to its fitting in order to avoid loss of the plug, while allowing it to separate completely from the fitting. Lanyards formed of metal wire have been used for this purpose. However, they are expensive, difficult to make, and difficult to attach to and remove from the plugs, especially if they are attached to the plug tightly enough to provide reliable protection against loss of the plug.

Another aspect of this invention is an improve lanyard, preferably injection molded and consisting of a resilient synthetic resin.

The lanyard is a unitary molded device comprising a loop and a flexible tether connected to the loop, and connectible to the fitting or other drain opening-providing means. The loop, when relaxed, has an oval-shaped opening with major and minor axes, the minor axis of the opening being less than the diameter of the floor of an annular groove in the exterior of the plug. By virtue of its resilience, the loop holds itself in engagement with the groove. However, the circumference of the loop is sufficient to enable it to be released from the groove when flexed. The lanyard may be attached to the fitting by a similar loop.

Still another problem encountered with plug-type freeze protection devices is that, when plug is inserted into a fitting in a coolant system, cold coolant can operate the actuator in the plug and prevent the plug from remaining in its latched condition as the temperature of the coolant rises. This problem is addressed by an auxiliary, manually operable latch for temporarily preventing the temperature-sensitive actuator from automatically releasing the plug, thereby allowing the temperature of the liquid in the liquid-containing system to rise from a temperature below the critical temperature without causing release of the plug. The manually operable latch can be in the form of a tab releasably engageable with a slot in an extension of the latching cam in the plug. Alternatively the manually operable latch can be a push-button operated auxiliary ball latch.

From the foregoing, it will be apparent that the invention has a number of important objects. These include, consistency of operation, avoidance of jamming of the latching balls, ease of insertion of the plug, easy identification for routine maintenance, prevention of the loss of identification labels, avoidance of the deleterious effects of debris and corrosion, ease of calibration, avoidance of failures due to paint bridges, avoidance of loss of the plug, the capability of closing a cold coolant system, and, in general, low cost, ease of use and reliability.

Other objects, details and advantages of the invention will be apparent from the following detailed description when read in conjunction with the drawings.

DETAILED DESCRIPTION

Figure 1:
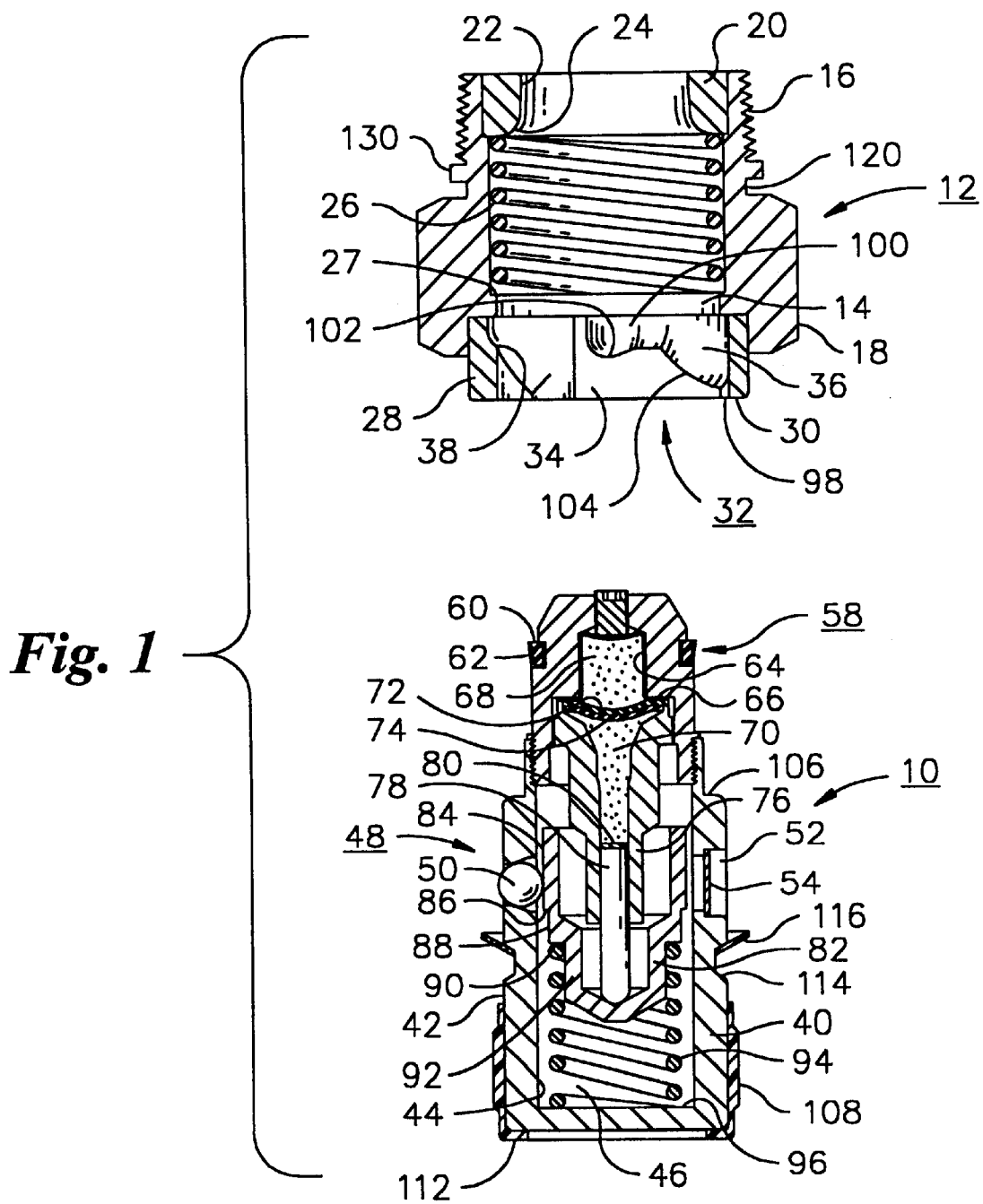
FIG. 1 is an exploded longitudinal section showing the plug and cooperating fitting of a preferred valve in accordance with the invention.

A preferred valve, as shown in FIG. 1, comprises a plug 10 and a fitting 12. The fitting has a central passageway 14 and external threads 16 at one end. These threads are engageable with threads in a T-joint (not shown) in a railroad locomotive cooling system, for example. A hexagonal nut 18 is formed on the outside of the fitting so that it can be installed and removed with the aid of a wrench.

Inside the threaded end of the fitting is a press-fit ring 20, providing a tapered sealing surface 22 having a rounded end 24. A strong, coiled plug ejection spring 26 is held in compression between an end face of the ring 20 and a shoulder 27 on the inner wall of the fitting.

The fitting 12 also includes a press fit ring 28 having an end face 30 surrounding a circular end opening 32. The inner wall 34 of the ring 28 has a set of three identical grooves, two of which are seen in FIG. 1 at 36 and 38. These grooves, the details of which will be described later with reference to FIG. 3, cooperate with balls projecting from the plug 10 to provide a bayonet connection by which the plug is releasably connectible to the fitting.

The plug 10 comprises a metal plug body 40, preferably of stainless steel, having a generally circular, cylindrical outer surface 42 and a generally circular, cylindrical inner wall 44 defining an interior space 46.

The plug body has a set of three radial openings, one of which is seen in FIG. 1 at 48. These openings are spaced at 120° intervals around the circumference of the plug body. Each opening has a tapered, frusto-conical shape throughout the majority of its length. The frusto-conical part of the opening becomes progressively narrower in the direction from the inner wall 44 toward the outer surface 42. Preferably, the opening is widest at the inner wall 44 and progressively narrows toward a location very near the outer surface 42. The outermost part of each opening, beyond the outermost part of the frusto-conical tapered part, is preferably cylindrical.

Figure 2:
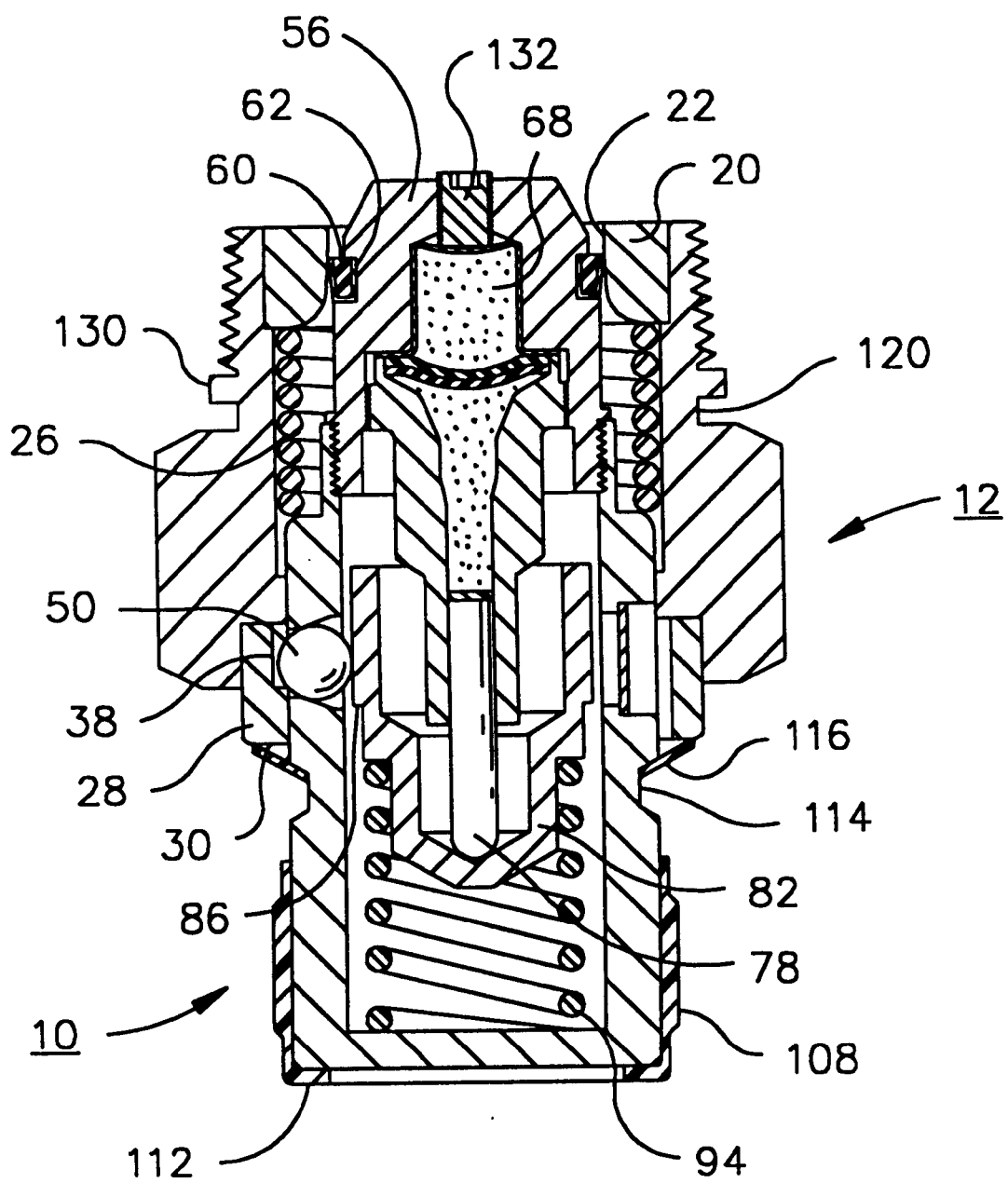
FIG. 2 is a longitudinal section showing the plug and fitting of FIG. 1 in their assembled condition.

A stainless steel ball is situated in each of these tapered openings, ball 50 being shown in FIG. 1. The diameter of the ball is greater than the length of the opening, less than the diameter of the widest part of the opening, and greater than the diameter of the narrowest part of the opening. The balls are inserted into the openings from the inside of the plug. They can project a short distance outwardly from the openings, as shown in FIG. 1, but cannot pass outwardly through the openings. The cylindrical part of each opening must be sufficiently short to permit the ball to protrude from the opening, as shown in FIGS. 1 and 2, while the ball is in contact with the frusto-conical part of the opening.

The tapered openings are formed by passing a tapered drill bit through larger openings directly opposite the locations of the tapered holes. One such larger opening is seen in FIG. 1 at 52. After the tapered openings are formed, the larger opening are sealed by press-fitting circular discs 54 into them. The discs bear against shoulders formed in these larger openings.

At the upper end of plug 10, as seen in FIG. 1, is an actuator housing 56 (best shown in FIG. 5), preferably of brass or other suitable heat-conducting metal. The housing 56 is threaded into the upper end of the stainless steel plug body 40. A resilient annular seal 58 fits in a groove in the outer surface of housing 56. The seal cooperates with tapered sealing surface 22 in ring 20, as shown in FIG. 2. The seal comprises an elastomeric core 60, held in an annular trough 62 of PTFE, polyamide, or other suitable plastics material. As the actuator housing 56 is pushed into the ring 20, the seal engages and is compressed by the tapered surface 22, forming a liquid-tight seal.

The actuator housing 56, has an interior space lined by a copper cup 64 having a flange 66. Inside this copper cup is a suitable thermally responsive material 68, typical a thermal wax. The thermally responsive material is selected so that it changes from liquid to solid at a specific critical temperature and contracts in volume as the temperature decreases through the critical temperature. U.S. Pat. Nos. 4,253,304 and 5,033,865 describe typical thermal actuators utilizing thermally responsive waxes.

The thermally responsive material 68 is separated from a flowable uncured silicone 70 by two layers of elastomeric membrane 72 and 74. The flowable uncured silicone 70 is situated in a tapered passage inside an element 76, which is threaded into housing 56. The narrow end of the tapered passage is cylindrical and receives a cylindrical piston 78, having an elastomeric sealing disc 80 at its end to prevent leakage of the flowable material 70.

As shown in FIG. 1, the piston 78 and element 76 extend into the interior of a cam 82. The upper portion of the cam has a cylindrical outer surface 84 which engages the balls (including ball 50) and is sufficiently large in diameter to hold the balls so that they protrude outwardly from the plug body. At the lower end of the outer surface 84, is a first shoulder 86, below which the cam has a narrower part 88. When part 88 is brought into register with the balls by upward movement of the cam, the balls are permitted to move inward. The cam has a third shoulder 90 below which is a still narrower portion 92. The narrower portion 92 extends into a coil spring 94, which is in compression between shoulder 90 and an end wall 96 of the plug body. The spring urges the cam in the upward direction, so that when the temperature falls below the critical temperature, and the thermally responsive material 68 contracts, the cam will move upward and the balls will be able to move inward.

The plug 10 is held in fitting 12 by the engagement of the three protruding balls with the grooves in wall 34 of the fitting 12. The three grooves are preferably identical, and two of them are shown at 36 and 38 in FIG. 1.

Groove 36 has an entrance 98, which meets, and extends axially upward from, the end face 30 of ring 28. A circumferentially extending portion 100 of the groove is spaced vertically from the end face 30 and circumferentially from the entrance 98. The end of the circumferential portion 100 farthest from the entrance 98 has a ball-receiving recess 102. A helical ramp 104 is provided between the entrance 98 and the circumferential portion of the groove. The ramp merges with a surface of the circumferential portion 100 and extends obliquely from the circumferential portion toward opening 32.

The entrances of the three grooves are positioned so that they can receive the three balls simultaneously as the plug is inserted into fitting 12. As the plug is pushed into the fitting, its shoulder 106 engages and begins to compress spring 26. Manual clockwise rotation of the plug causes the balls to ride up the helical ramp 104, pushing the plug farther into the fitting until the seal 58 engages surface 22. The balls enter recess 102 and its corresponding recesses in the other grooves, and spring 26 exerts a downward force on the plug, holding the balls in the recesses. Thus, the balls and grooves provide a bayonet joint. For manual release of plug 10, it must be pushed inward against spring 26, and then rotated counterclockwise until the balls clear the recesses of the grooves.

The ramp surfaces of the grooves assist in manual engagement of the plug by helping to overcome the force exerted by the strong ejection spring 26. Because the compressible seal 58 is engaged with a gradually tapered surface 22, no lost motion is needed in the sealing elements, and an effective seal is provided throughout a range of axial positions of the plug. Thus, use of a seal comprising a radially compressible seal ring and a tapered surface makes it possible to take advantage of the helical ramp to assist in engagement of the plug, and to obtain a secure seal against a substantial head of pressure. The seal 58 and the sealing surface 22 engage each other over an annular area of contact having an outer diameter which is less than the diameter of the cylindrical outer surface 42 at the location of the openings. As mentioned previously, the small diameter of the seal makes it possible to use an ejection spring that reliably ejects the plug, but is not so strong as to make insertion of the plug difficult.

As shown in FIG. 2, where the plug 10 is engaged with the fitting 12, ball 50 is in engagement with the bottom of the recess in the circumferential part of groove 38. Release of the plug from the fitting takes place when a decrease in temperature, sensed by the actuator, causes the thermally responsive material 68 to contract. The contraction of material 68 allows piston 78 to move upward, which, in turn, allows spring 94 to push cam 82 upward until its shoulder 86 clears the balls. The balls then move inward, so that they are no longer engaged with the grooves in wall 34 of ring 28, and allow spring 26 to eject the plug from the fitting.

The tapered surfaces of the openings in which the balls are situated prevent the balls from becoming jammed in two ways. First, because of the taper, a slight inward movement of a ball releases it from engagement with the wall of the opening. Second, as the ball is cleared by the cam, the bottom of the recess in the circumferential part of groove 38 and the tapered surface of the opening exert inward forces on the lower and upper parts of the ball, respectively. The resultant inward force acting on the ball is greater than the inward force resulting from the action of the bottom of the recess alone. Another advantage of the tapered openings is that they are easily and precisely machined by passing a drill through the larger opposed openings.

Figure 3:
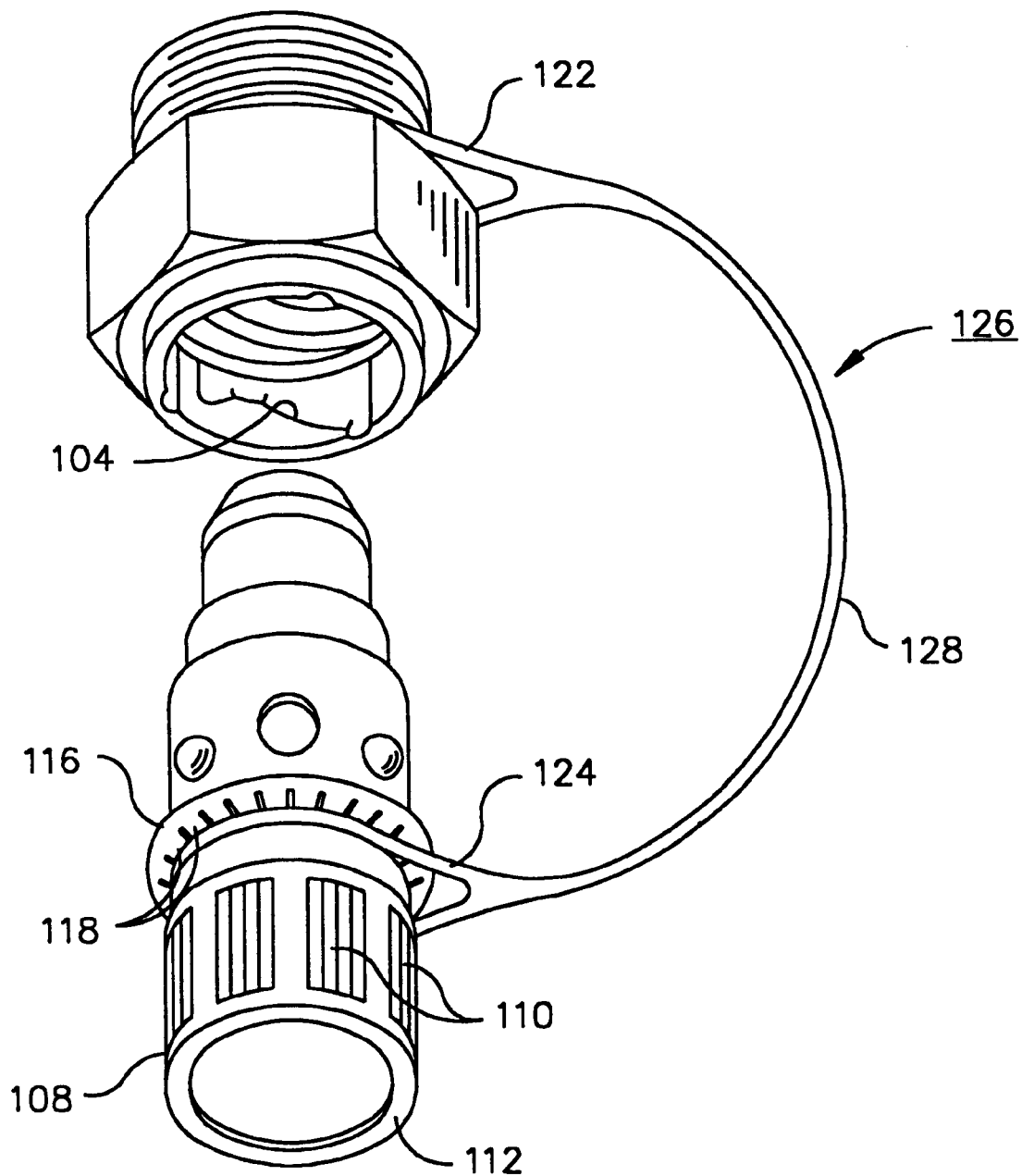
FIG. 3 is an isometric view showing the plug and fitting connected by a molded lanyard.

A cap 108 fits onto the lower part of plug body 40, as shown in FIGS. 1–3. The cap is molded from a suitable synthetic resin, for example nylon. The cap is attached to the plug body by first heating the cap in hot water to cause it to soften and expand, and then placing it on the plug body and allowing it to cool. As it cools, the cap is stretched circumferentially by the cylindrical external portion of the plug body, and fits onto the plug body with an interference fit. Friction prevents the cap from rotating relative to the plug body. Because of the interference fit, the cap remains attached to the plug body even at the relatively high temperatures typically encountered in the vicinity of an operating locomotive coolant system.

The cap includes longitudinal ribs 110 which allow it to be grasped firmly so that the plug body can be rotated to engage the balls with the circumferential portions 100 of the grooves. The ribs on the cap make it possible to utilize the helical ramp 104 to assist in inserting and locking the plug into the fitting 12.

The caps are preferably provided in a variety of colors, and replaced with caps of different colors annually after routine maintenance has been performed. The inwardly extending flange 112, which overlies the end of the plug body 40, provides a frame for a label (not shown) affixed to the plug body.

As shown in FIGS. 1 and 2, the plug body 40 has an annular groove 114 in its exterior surface. A resilient, flexible shield 116, situated in this groove, prevents paint, which may be unintentionally sprayed onto the plug and fitting, from sealing the plug to the fitting and thereby preventing the plug from being released when the temperature approaches freezing. The shield, also seen in FIG. 3, is preferably made of nylon, and is frusto-conical in shape, with its wide end engageable with the end face 30 of ring 28, as shown in FIG. 2. The ring covers at least part of the end face 30 of ring 28, and, preferably, the diameter of the wide end of the shield is nearly equal to the outer diameter of ring 28.

The inner part of the shield consists of fingers 118 (FIG. 3) which extend from an intermediate part of the shield toward its narrow end and engage the innermost part of groove 114.

The shield prevents paint from sealing the plug to the drain opening, and is sufficiently flexible to allow the ejection spring to remove the plug from the drain opening even when the shield itself is painted. The ring greatly reduces the likelihood that paint bridging the plug and the fitting will be sufficient to prevent release of the plug. Even if paint causes the ring to adhere to the fitting, the fingers will disengage the groove in the plug, and allow the plug to be released.

Figure 4:
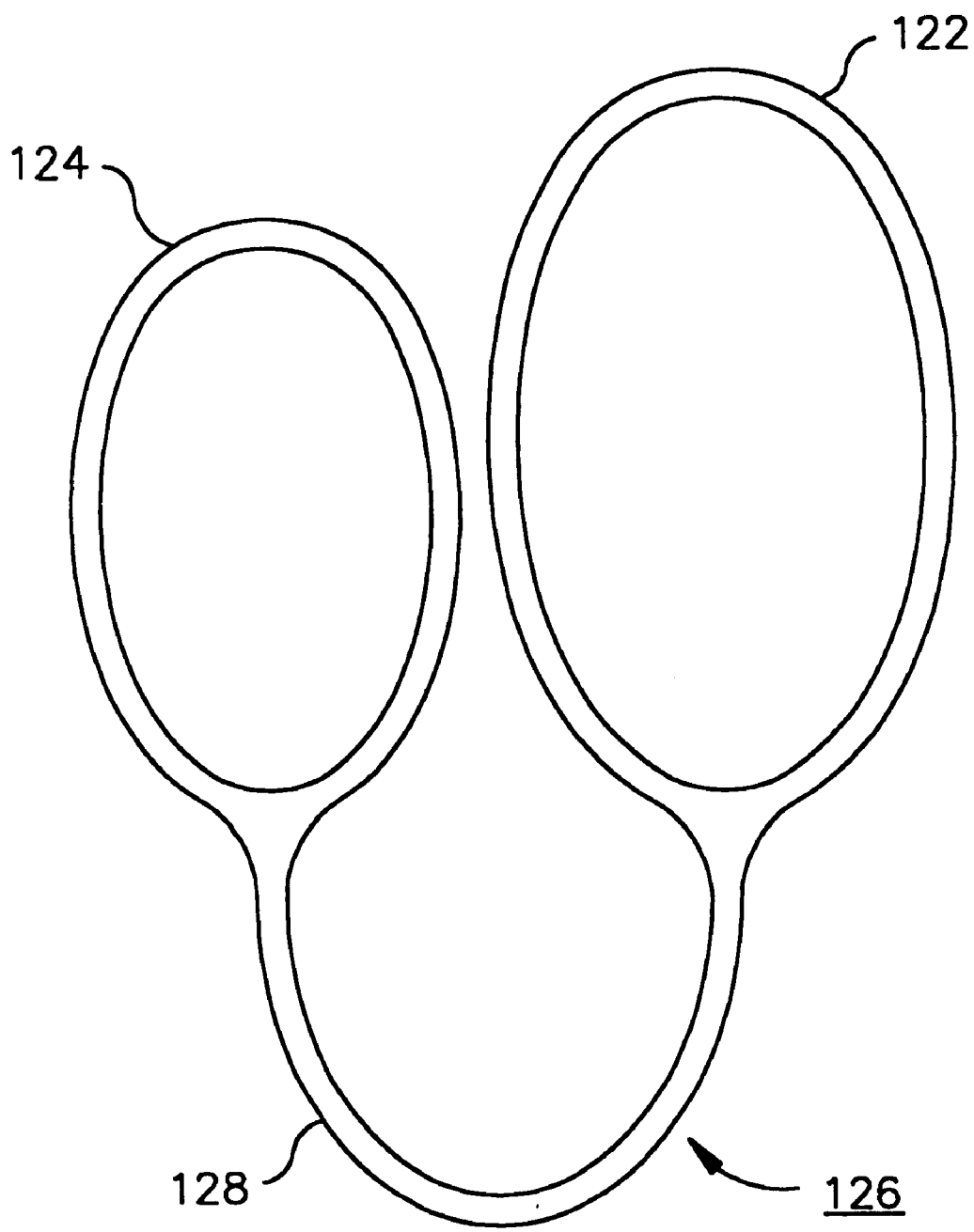
FIG. 4 is a plan view showing the lanyard as it comes out of a mold.

As shown in FIGS. 1 and 2, the fitting 12 is provided with an annular groove 120. This groove, and annular groove 114 in the plug retain opposite end loops 122 and 124 of a molded lanyard 126, shown in FIGS. 3 and 4. The lanyard is injection molded from nylon, and comes out of the mold as a unit in a planar configuration as shown in FIG. 4, the loops 122 and 124 being oval in shape and connected by a flexible link 128. The lanyard is resilient and the loops, when relaxed, as in FIG. 4, retain their oval shape, with the minor axis (i.e. the minimum transverse dimension) of the opening of each loop being less than the diameter of the floor of the groove with which it is to be engaged. Thus, when the loops are engaged with the grooves, as in FIG. 3, they securely connect the plug to the fitting. On the other hand, the circumference of each loop is sufficient to enable it to be released from its groove when flexed. Preferably, the circumference of loop 124 is just slightly larger than that of cap 108, and the circumference of loop 122 is just slightly larger than that of the ridge 130 (FIGS. 1 and 2) above groove 120.

By virtue of its molded construction, the lanyard is easy and inexpensive to make, and easy to attach to and remove from the plug and fitting. However, it reliably attaches the plug to the fitting to prevent loss of the plug when it is released from the fitting either manually or as the result of freezing conditions.

Figure 5:
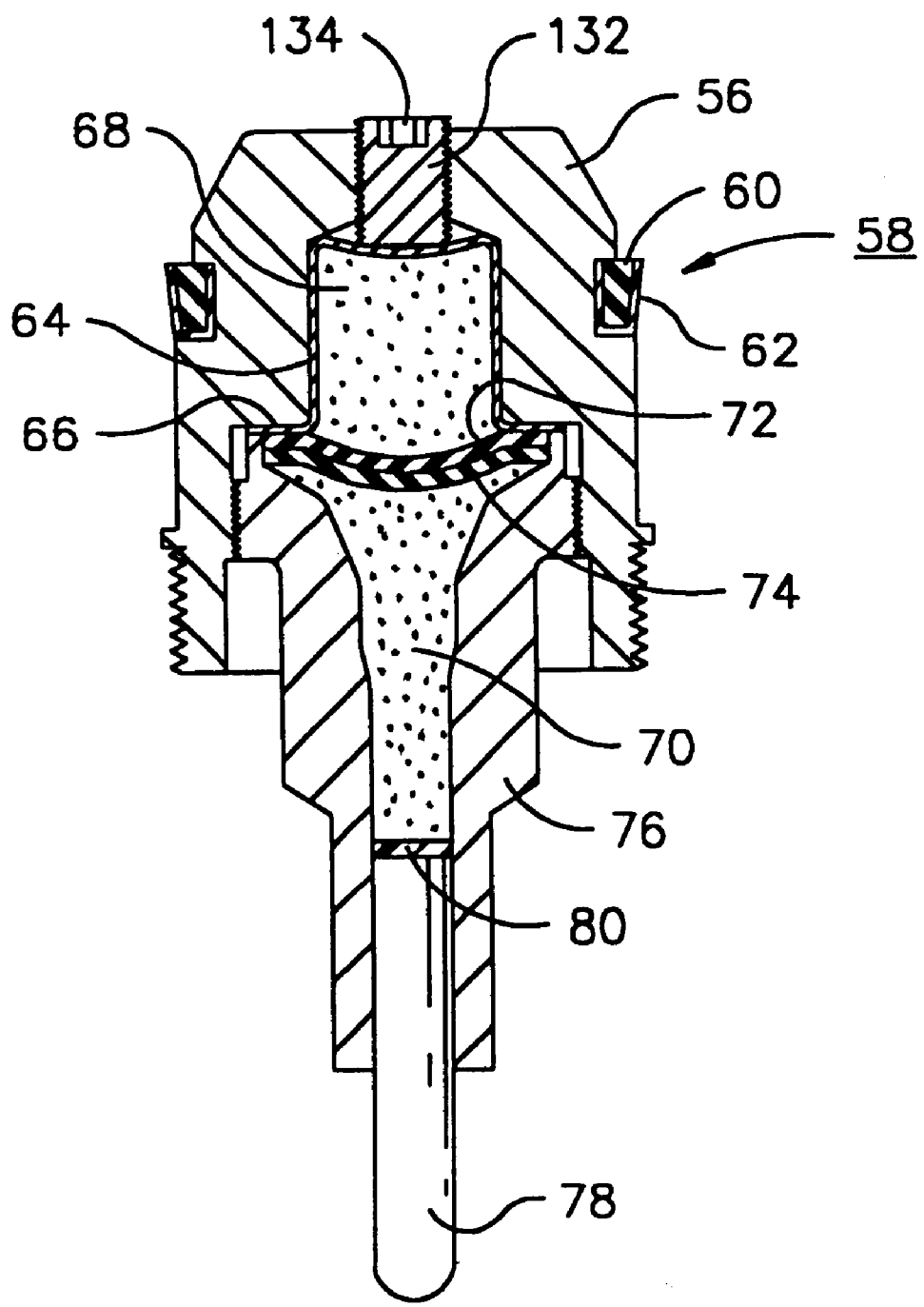
FIG. 5 is a longitudinal section of an actuator of the type used in the valve of FIGS. 1–3.

As shown in FIG. 5, the actuator body is located in a metal housing 56 having a set screw 132, which bears against the top of the actuator cup 64. The set screw is threaded into housing 56 and aligned with the axis of the actuator assembly. It has a hexagonal recess 134 in its end for receiving an Allen wrench for adjustment. With the actuator in place in the plug, as shown in FIG. 1, the position of the cam can be viewed through one of the radial holes corresponding to hole 52, preferably with the aid of a specially designed magnifying insert (not shown) replacing disc 54. The magnifying insert preferably has a calibration line, with which the cam can be aligned. As the set screw is turned clockwise by an Allen wrench, it compresses the end of the actuator cup 64, and applies a pressure to the thermal material inside the actuator, forcing the piston 78 outward. In calibration, the piston is forced outward in this manner until the end of the cam, or an index mark on the cam, is in register with the calibration line. Although it is not normally necessary to retract the cam in the calibration procedure, if the cam is moved too far, it can be retracted by turning the set screw 132 counterclockwise. Spring 94 applies the necessary axial force to move the cam in the retracting direction.

Since the actuator housing is designed to be in the fluid stream, the set screw is easily accessible. It is unnecessary to carry out calibration by adjusting the positions of elements operated by the actuator.

Figure 6:
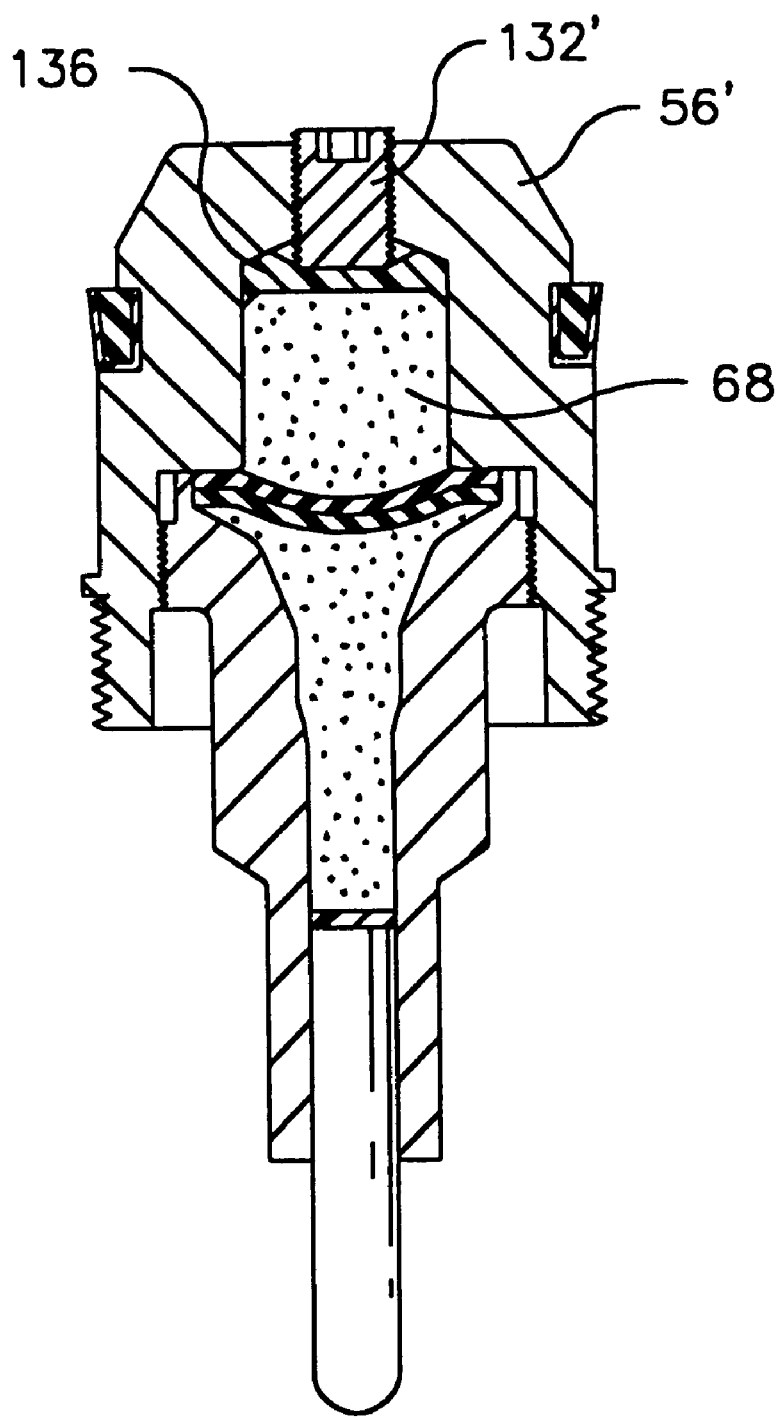
FIG. 6 is a longitudinal section of an alternative actuator.

In the alternative embodiment shown in FIG. 6, the expansible material is in direct contact with the inside of housing 56', there being no actuator cup corresponding to cup 64. The set screw 132' bears against a PTFE element 136, which forms the top of the chamber in which the thermally responsive material 68' is located. In this case, the chamber must be cylindrical. Otherwise, the construction of the actuator assembly of FIG. 6 is similar to that of FIG. 5. The actuator of FIG. 6 has the advantage that it is less expensive than the actuator of FIG. 5. In either device, instead of machining the actuator housing out of metal, the actuator housing can be formed from a synthetic resin by injection-molding.

Figure 7:
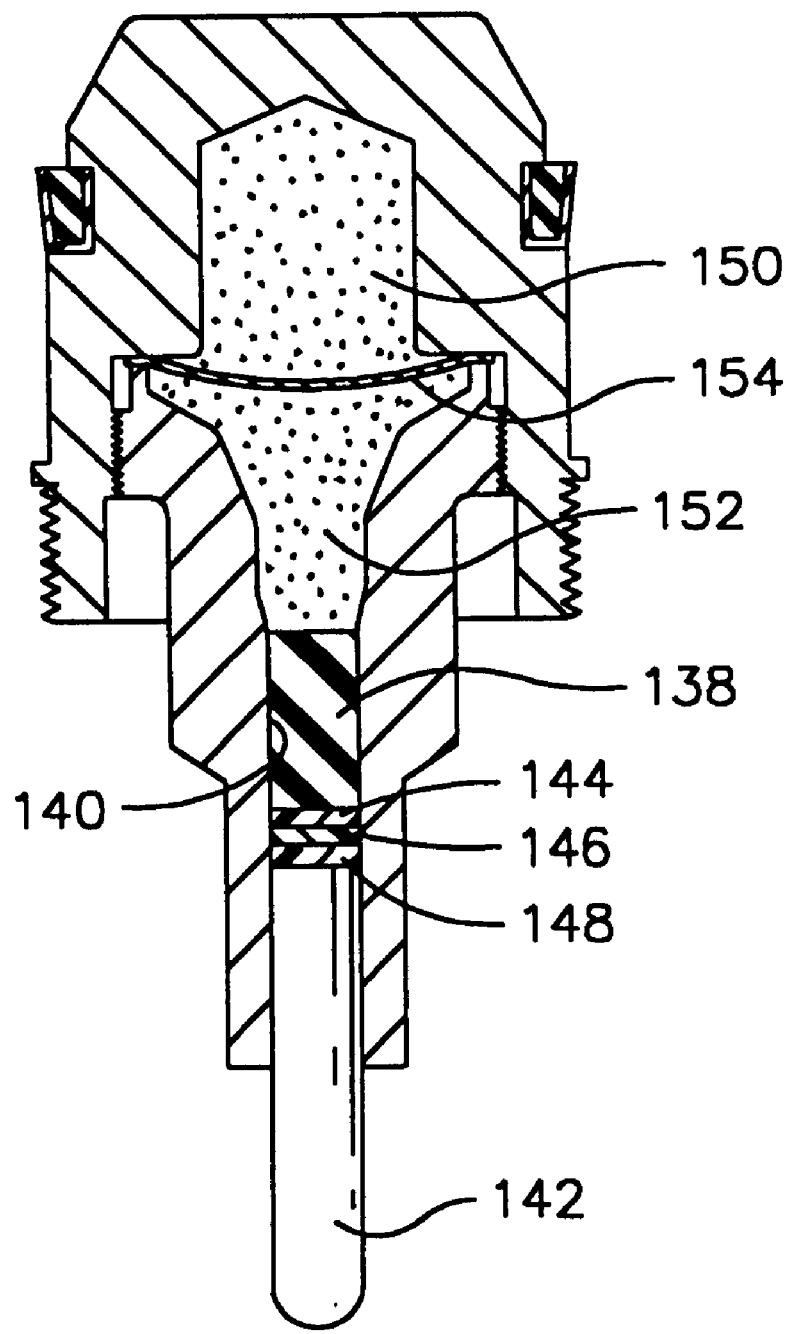
FIG. 7 is a longitudinal section of another alternative actuator.

In the modified actuator shown in FIG. 7, calibration is achieved by installing or removing discs which determine the position of the piston. A rubber plug 138 is situated in the cylindrical passage 140 in which piston 142 slides. The relaxed diameter of the rubber plug 138 is slightly larger than the diameter of the cylindrical passage 140, and the piston 142 fits into the passage with a snug fit such that friction holds it in position except when overcome by a force exerted by expansion of the thermally responsive material or by the spring corresponding to spring 94 (FIG. 1).

One or more discs 144, 146 and 148, of PTFE or similar material are located between the rubber plug and the piston. The diameters of the discs are slightly smaller than that of the passage 140, so that they drop out of the passage when the piston is removed. One or more of these discs can be removed, or additional discs can be added to adjust the position of the piston.

In the actuator of FIG. 7, the expansible material 150 is separated from the flowable silicone material 154 by a copper diaphragm, typically 0.003 inches thick. A copper diaphragm can be used instead of elastomeric discs in any of the actuators of this invention.

Figure 8:
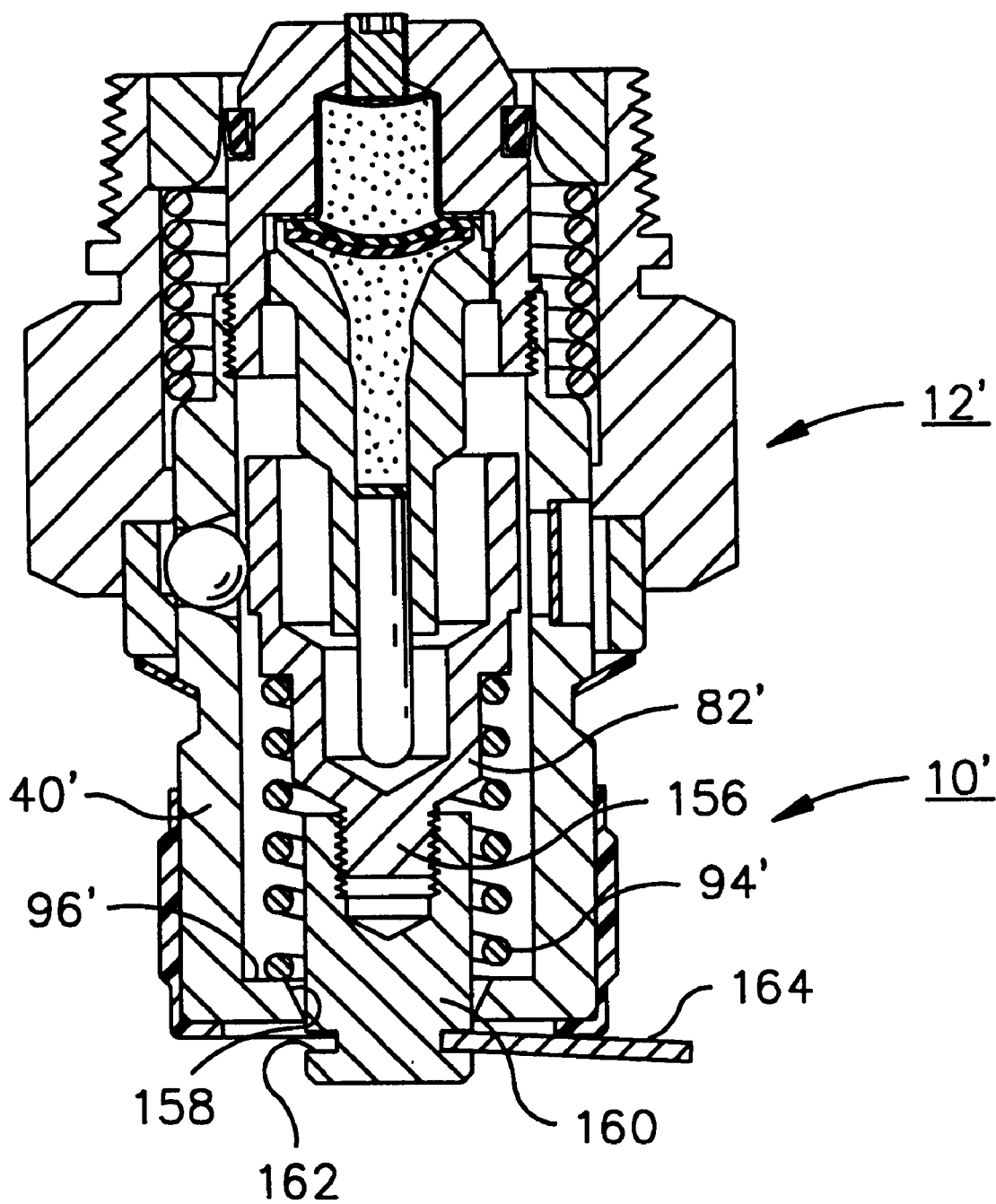
FIG. 8 is a longitudinal section of a fitting and a modified plug having a mechanism for temporarily preventing the plug from being released when a protected coolant system is being filled with cold water.

The assembly of FIG. 8 is similar to the assembly of FIG. 2 except that the cam 82' has a threaded extension 156, and the end wall 96' of the plug body 40' has a chamfered opening 158 through which a cylinder 160 extends. The cylinder 160 is threaded onto the cam extension 156, and has an annular slot 162 engageable by a metal tab 164. The tab can be any conveniently available coin, e.g. a penny. The slot 162 is located on the cylinder 160 so that, when it is located slightly beyond the end wall, and able to be engaged by the tab 164, the cam 82' is positioned to hold the latching balls in their projecting position.

Ordinarily, when the plug 10' is inserted into the fitting 12', the actuator will have been warmed sufficiently to bring the cam to the position in which it holds the latching balls in their projecting condition. However, if the water in the coolant system being protected is very cold when the plug 10' is inserted into the fitting 12', it can cause the thermally responsive material in actuator to contract. Tab 164 is attached temporarily to cylinder 160, and the plug is engaged with the fitting by insertion and twisting as in the case of the plug of FIGS. 1 and 2. The engagement of tab 164 with the cap 108' prevents contraction of the thermally responsive material from allowing the spring 94' to urge the piston upward and thereby releasing the plug from the fitting. Thus, when the plug is about to be inserted in the fitting, a tab 164 is installed temporarily in slot 162. When the coolant system becomes sufficiently warm, the tab 164 is removed so that the plug can be released automatically when the temperature of the coolant water falls below a predetermined limit. The width of slot 162 is preferably slightly greater than the thickness of the tab, so that the tab falls out of the slot automatically when warming of the liquid system causes the actuator piston to move cylinder 160 downward. After the tab falls away, the device is able to operate in the same manner as the device of FIGS. 1 and 2. The chamfer of the opening 158 allows any ice accumulated in the opening to move upward into the plug body, thereby releasing the cylinder so that it can move upward under the force exerted by spring 94'.

Figure 9:
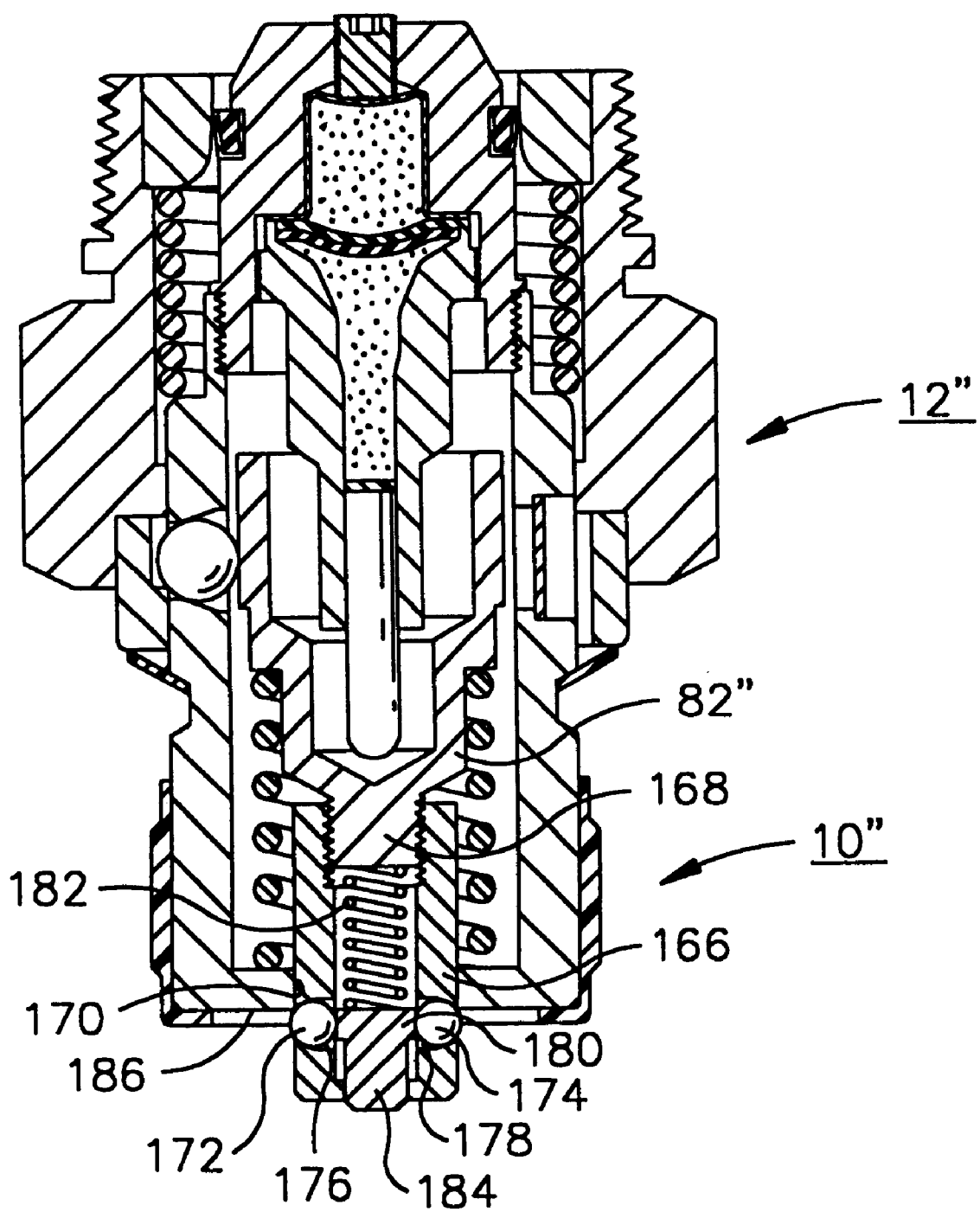
FIG. 9 is a longitudinal section of a fitting with an alternative modified plug for the same purpose as that of FIG. 8.

The assembly shown in FIG. 9 is similar to that of FIG. 8 except that cylinder 166, which is threaded onto extension 168 of cam 82' and extends through opening 170 in the plug body, has detent balls 172, 174, which can be held in an outwardly projecting condition in tapered holes 176, 178 by a spring-loaded, push-button cam 180. The cam is urged downward by a coil spring 182, and has a manual push-button 184, which can be pushed upward, against the force exerted by spring 182, to cause the balls cause the balls to project outwardly through holes 174 and 176 so that they can engage the bottom surface 186 of wall 96" of the plug body. The wall 96" exerts an inward force on the balls, which in turn frictionally engage the cam 180, holding it in the position shown, until the inwardly directed force on the balls is released by downward movement of the cylinder or until the push-button 184 is pressed manually.

The plug 10" of FIG. 9 is installed in the fitting 12", by inserting and twisting the plug in bayonet fashion, just as in the case of FIGS. 1 and 2. However, before insertion of the plug into the fitting, the actuator end of the plug is warmed while the push-button 184 is pressed. This causes the piston of the actuator to extend. As soon as the balls 172 and 174 clear the opening in wall 186, they are pushed outward by the button 184. When the balls are pushed outward, warming of the actuator is discontinued, and the balls 172 and 174 engage the wall 186. The inward force exerted by the edge of the wall on the balls holds them in frictional engagement with push-button 184, and maintains the push-button in the position in which it is shown in FIG. 9. The plug can then be easily installed into the fitting in bayonet fashion. Thereafter, when the system becomes sufficiently warm, the actuator pushes cylinder 166 downward and the balls disengage the wall 186. This allows the spring 182 to push the push-button downward, releasing the balls for inward movement. Afterwards, the device operates in the same manner as the device of FIGS. 1 and 2.

As will be apparent from the above description, the invention has numerous advantages over the prior art. The tapered openings for the latching balls reduce jamming, and can be made to the necessary precision without difficulty. The helical ramps in the ball-receiving grooves permit the use of a strong and reliable plug ejecting spring, while making manual insertion of the plug easy, especially when aided by the ribs of the cap, which facilitate manual grasping and rotation of the plug. The cap, in turn, serves both to retain an identifying label, and to provide an indication of whether or not periodic routine maintenance has been performed. The paint shield prevents failures resulting from paint bridges adhering both to the plug and to the fitting. The lanyard is simple and inexpensive to manufacture and easy to install and remove, yet reliably prevents loss of the plug. Positioning the seal on the liquid system side of the latching balls isolates moving parts from the liquid system, and also reduces the seal diameter with resulting improvements in reliability and reduction of leakage. The actuator housing is also located on the plug body so that it is also positioned in the passageway between the balls and the liquid-containing system when the seal and the sealing surface are engaged with each other. Thus, the actuator responds directly to the temperature of the liquid in the liquid system, without making it necessary to expose the balls and associated moving parts to the liquid. Finally, by using a set screw to apply pressure to the thermally responsive material and thereby move the actuator piston, the actuator can be calibrated easily and accurately.

Various other modifications can be made to the apparatus described. For example, while the plug 10 preferably utilizes a seal 58 which slides along a tapered surface 22, many of the advantages of the invention can be realized in plugs using other forms of seals, including a conventional seal formed between two axially abutting surfaces. Likewise, the tapered ball-retaining openings, the actuator calibration screw, the lanyard, the paint shield, and other features of the invention have potential utility in various alternative freeze protection plug assemblies, valve mechanisms and the like. The plug assembly described above presently has its primary utility in railroad locomotive freeze protection, but versions of the plug assembly can be used in many other applications, including replacement of freeze plugs in compressors and other water-cooled machinery, and in the protection of water systems in industrial plants.

Still other uses and modifications may be made without departing from the scope of the invention as defined in the following claims.

What is claimed is:

1. A valve mechanism comprising a body having a sealing means cooperable with a sealing surface in a fluid passage, and a sidewall defining an internal chamber within the body, a plurality of openings in the sidewall, a ball situated in each of the openings, the diameter of each ball being greater than the length of the opening in which it is situated, cam means within said internal chamber, the cam mean being engageable with the balls for selectably maintaining the balls in a condition in which they protrude outwardly from the openings for engagement with a detent for holding the body in a position in which the sealing means is engaged with the sealing surface, and releasing the balls for retraction into the openings, wherein the openings are tapered, throughout a major part of their lengths, in the direction from the internal chamber toward the exterior of the body, the taper being such that the diameter of a first part of each opening is greater than that of the ball situated in the opening, and the diameter of a second part of the each opening, situated outward from the first part thereof, is smaller than the diameter of the ball situated in the opening, and wherein the body has an access hole in the side wall for each of the tapered openings, each access hole being located on a side of the body opposite one of the tapered openings so that the tapered configuration of each of the tapered openings can be formed by a tool inserted through its opposite access opening before the balls are located in the tapered openings and the cam is located in the internal chamber.

2. A valve mechanism according to claim 1 in which the tapered parts of the openings are frusto-conical in shape.

3. A valve mechanism according to claim 1 in which the body has a circular cross-section and an access hole in the side wall for each of the tapered openings, each access hole being diametrically opposed to one of the tapered openings.

4. A valve mechanism according to claim 1 in which the body has a circular cross-section and an access hole in the side wall for each of the tapered openings, each access hole being diametrically opposed to one of the tapered openings and being closed by a seal.

5. A valve mechanism according to claim 1 including means providing a fluid passage and a sealing surface in the fluid passage, cooperable with the sealing means on said body.

6. A valve mechanism according to claim 1 including means providing a fluid passage and a sealing surface in the fluid passage cooperable with the sealing means on said body, and means in said fluid passage engageable by said balls to hold the sealing means in engagement with the sealing surface.

7. A valve mechanism according to claim 1 including means providing a fluid passage and a sealing surface in the fluid passage cooperable with the sealing means on said body, means in said fluid passage engageable by the balls to hold the sealing means in engagement with the sealing surface and spring means urging said body in a direction to disengage the sealing means from the sealing surface.

8. A valve mechanism according to claim 1 including means providing a fluid passage and a sealing surface in the fluid passage cooperable with the sealing means on said body, and means in said fluid passage engageable by the balls to hold the sealing means in engagement with the sealing surface, said means engageable by the balls and the tapered parts of the openings being engageable with different parts of the balls and both being shaped to exert forces on said balls when said body moves in the direction to disengage the sealing means from the sealing surface, each of said forces having a component in the retracting direction of the ball on which it is exerted.

* * * * *